UNITED STATES PATENT OFFICE.

NEWTON EVANS, OF LOS ANGELES, CALIFORNIA, ASSIGNOR OF ONE-THIRD TO CARL F. SCHADER AND ONE-THIRD TO WILLIAM H. HEADY, BOTH OF LOS ANGELES, CALIFORNIA.

PROCESS OF EXTRACTING COPPER FROM ORES, &c.

1,297,670.   Specification of Letters Patent.   Patented Mar. 18, 1919.

No Drawing.   Application filed September 11, 1918. Serial No. 253,643.

*To all whom it may concern:*

Be it known that I, NEWTON EVANS, a citizen of the United States, residing at Los Angeles, in the county of Los Angeles and State of California, have invented new and useful Improvements in Processes of Extracting Copper from Ores, &c., of which the following is a specification.

My invention relates to a process of extracting copper from ores and also to the refining of crude copper.

It is an object of this invention to treat copper ores and the like with an inexpensive reagent forming a copper salt solution, from which the metallic copper may be recovered by the usual methods of depositing on iron or electrolytically.

My invention consists in the steps of the process hereinafter described and claimed.

I have discovered that a by-product in the manufacture of explosives, the so-called niter cake, may be used for the rapid and efficient extraction of copper and for the refining of crude copper. The chemical composition of niter cake may vary considerably in the relative proportion of the ingredients composing it. The following is a chemical analysis of a sample of the niter cake used in my process:

| | |
|---|---|
| Sodium sulfate ($Na_2SO_4$) | 68.13% |
| Potassium sulfate ($K_2SO_4$) | 0.48% |
| Sulfuric acid ($H_2SO_4$) | 28.42% |
| Iron and alumina | Trace only. |
| Nitrates | Delicate trace only. |
| Insoluble matter | Delicate trace only. |
| Water | 2.70% |

I take copper ores such as copper carbonate or copper oxid and pulverize the same to pass through a 10 to 20 mesh screen and treat the same with a solution of niter cake. The proportion of niter cake to the copper being in ratio of one-half ($\frac{1}{2}$) pound of niter cake to one (1) pound of copper contained in the ore. The strength of the solution is about 3 gal. of water to each pound of niter cake used. I agitate the mixture of copper ore and niter cake solution preferably in wooden tanks. The time required for a complete extraction of the ore will vary with the condition of the ore but usually requires about one hour. The mixture is allowed to settle and the liquid which contains the copper in solution is decanted. The copper is recovered from the decanted solution by the introduction of iron on which it is precipitated or by electrolytic deposition. It will be obvious that the copper in solution is in the form of copper sulfate since sulfuric acid is the valuable ingredient in the niter cake and while it is not new to use sulfuric acid in the wet extraction of copper, a valueless by-product is utilized by my process in the extraction of copper.

While I have described the use of niter cake in connection with the extraction of copper and refining of copper, it will be obvious that the niter cake may be used in the extraction and refining of other metals.

It will, of course, be understood that the sulfuric acid shown in the analysis of the niter cake above referred to does not exist in the free state, but that the sulfuric acid forms with the normal sodium sulfate acid sodium sulfate. However, the sulfuric acid acts on the copper ore as if existing in the free state.

It is not merely the use of the sulfuric acid in the niter cake that makes my invention valuable, but the presence of sodium sulfate in the solution. The mixture of the two is more efficient in the extraction of the metal than if sulfuric acid alone is used, for the reason that the mixture exercises a selective action on the ore in not attacking and dissolving iron, aluminum and other compounds acted on by sulfuric acid, consequently, the solution is somewhat purer in its contents of copper sulfate than if sulfuric acid alone had been used.

I claim:

1. The process of extracting metal from ores and the like comprising subjecting the same to an aqueous solution of niter cake thereby forming a soluble metal salt and recovering said metal from the solution.

2. A process of treating copper ores comprising subjecting the crushed copper ore to an aqueous solution of niter cake thereby forming copper sulfate and recovering the copper from the solution.

3. A process of treating copper ores and the like comprising subjecting the same to an aqueous solution of niter cake, the strength of the solution being in the proportion of one pound of niter cake to two pounds of copper, thereby forming copper sulfate in solution and recovering the copper from the solution.

4. A process of treating copper ore and the like comprising subjecting the same to an aqueous mixture of sodium sulfate and sulfuric acid, thereby forming copper sulfate in solution and recovering the copper from the solution.

In testimony whereof I have signed my name to this specification.

NEWTON EVANS.

Copies of this patent may be obtained for five cents each, by addressing the "Commissioner of Patents, Washington, D. C."